United States Patent
Dagci (10) Patent No.: US 7,598,851 B2
(45) Date of Patent: Oct. 6, 2009

(54) METHOD AND APPARATUS FOR TRANSMITTING WIRELESS SIGNALS ON A MOBILE PLATFORM

(75) Inventor: Oguz H. Dagci, Sterling Heights, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 302 days.

(21) Appl. No.: 11/538,071

(22) Filed: Oct. 3, 2006

(65) Prior Publication Data

US 2007/0103289 A1    May 10, 2007

Related U.S. Application Data

(60) Provisional application No. 60/723,152, filed on Oct. 3, 2005.

(51) Int. Cl.
  G08B 19/00    (2006.01)
  G08B 1/08    (2006.01)
  B60Q 1/00    (2006.01)
(52) U.S. Cl. ............... 340/521; 340/438; 340/445; 340/447; 340/539.1; 340/539.22
(58) Field of Classification Search ............ 340/521
  See application file for complete search history.

(56) References Cited

U.S. PATENT DOCUMENTS

| | | | |
|---|---|---|---|
| 6,629,033 B2 * | 9/2003 | Preston et al. | 701/70 |
| 6,885,296 B2 | 4/2005 | Hardman et al. | |
| 6,944,528 B2 | 9/2005 | Nagano | |
| 7,046,166 B2 | 5/2006 | Pedyash et al. | |
| 7,142,099 B2 * | 11/2006 | Ross et al. | 340/438 |
| 2004/0158367 A1 * | 8/2004 | Basu et al. | 701/29 |
| 2004/0233055 A1 * | 11/2004 | Canich et al. | 340/539.26 |

OTHER PUBLICATIONS

Lewis, F.L., Wireless Sensor Networks, Smart Environments: Technologies, Protocols, and Applns, 2004, John Wiley, NY, NY, USA.
Shan, Q., Wireless Intelligent Sensor Networks for Refrigerated Vehicle, IEEE 6th CAS Symp. on Emerging Tech., May 2004, pp. 525-528, IEEE. Shanghai, China.
Akyildiz, W., Wireless Sensor Networks: A Survey, Computer Networks, 2002, pp. 393-422, vol. 38, Elsevier Science B.V., Atlanta, GA, USA.
Costlow, T., Safety Drives Sensor Growth: Automotive Engineering Int'l, Apr. 2005, pp. 65-72, SAE, Warrendale, PA, USA.

* cited by examiner

*Primary Examiner*—Donnie L Crosland (57) ABSTRACT

A method and apparatus to wirelessly transmit information within a mobile platform is provided, comprising a local processor, signally connected to a plurality of sensing devices and operative to process input signals from the sensing devices. There is a control module and a wireless communication system, operative to selectively transmit information between the local processor and the control module. Selectively transmitting information comprises assigning a communications priority to each input signal, the communications priority comprising one of a non-event, a first-level event, a second-level event, and a third-level event; and, transmitting the input signals to the control module based upon the communications priority.

19 Claims, 5 Drawing Sheets

METHOD AND APPARATUS FOR TRANSMITTING WIRELESS SIGNALS ON A MOBILE PLATFORM

CROSS-REFERENCE TO RELATED APPLICATIONS

This application claims priority from U.S. Provisional Application No. 60/723,152 filed Oct. 3, 2005, entitled METHOD AND APPARATUS FOR TRANSMISSION OF WIRELESS SIGNALS.

TECHNICAL FIELD

This invention pertains generally to transmitting signals on a mobile platform, and more specifically to a method and apparatus to wirelessly transmit signals.

BACKGROUND OF THE INVENTION

New, affordable and reliable communications technologies enable the use of wireless devices on mobile platforms, e.g., motor vehicles, to transmit sensor signal information and actuator control commands. The advantages of wireless devices include an ability to customize an application, add features, and reduce costs. Faults in the wireless communications link, or delays in message delivery that exceed an admissible limit are undesirable. Delivery of messages can include using high bandwidth transmission channels with high data transmission rates to overcome communication bottlenecks and using different transmission channels for every two or three sensors. However, in either case, the available bandwidth on each transmission channel is not effectively utilized, and, there are a limited number of available communications bands. Moreover, for every transmission channel, use of a different wireless transceiver increases system costs unnecessarily.

Therefore, there is a need for a method and apparatus to wirelessly transmit information from remote sensors to a main processor on a mobile device, with a high utilization of the wireless communications channel.

SUMMARY OF THE INVENTION

To address the foregoing concerns, and in accordance with the invention described hereinbelow, a system to wirelessly transmit information within a mobile platform is provided, comprising a local processor, signally connected to a plurality of sensing devices and operative to process input signals from the sensing devices. There is a control module and a wireless communication system, operative to selectively transmit information between the local processor and the control module. Selectively transmitting information comprises selectively assigning a communications priority to each input signal, the communications priority comprising one of a non-event, a first-level event, a second-level event, and a third-level event; and, selectively transmitting the input signals to the control module based upon the communications priority.

These and other aspects of the invention will become apparent to those skilled in the art upon reading and understanding the following detailed description of the embodiments.

BRIEF DESCRIPTION OF THE DRAWINGS

The invention may take physical form in certain parts and arrangement of parts, the preferred embodiment of which will be described in detail and illustrated in the drawings which form a part hereof, and wherein.

DETAILED DESCRIPTION OF THE EMBODIMENTS

Figure 1:
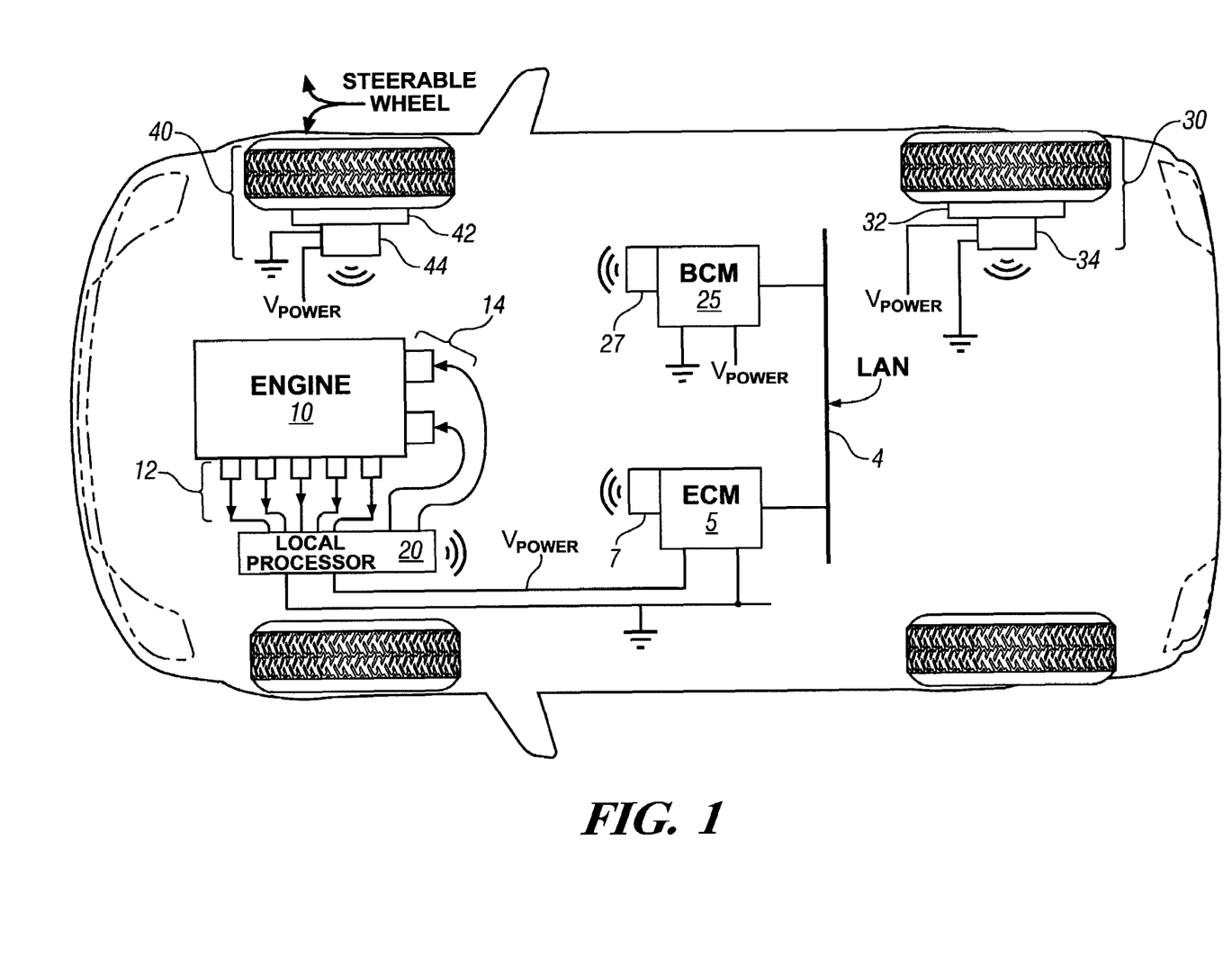
FIG. 1 is a schematic diagram of a vehicle system, in accordance with the present invention.
Figure 2:
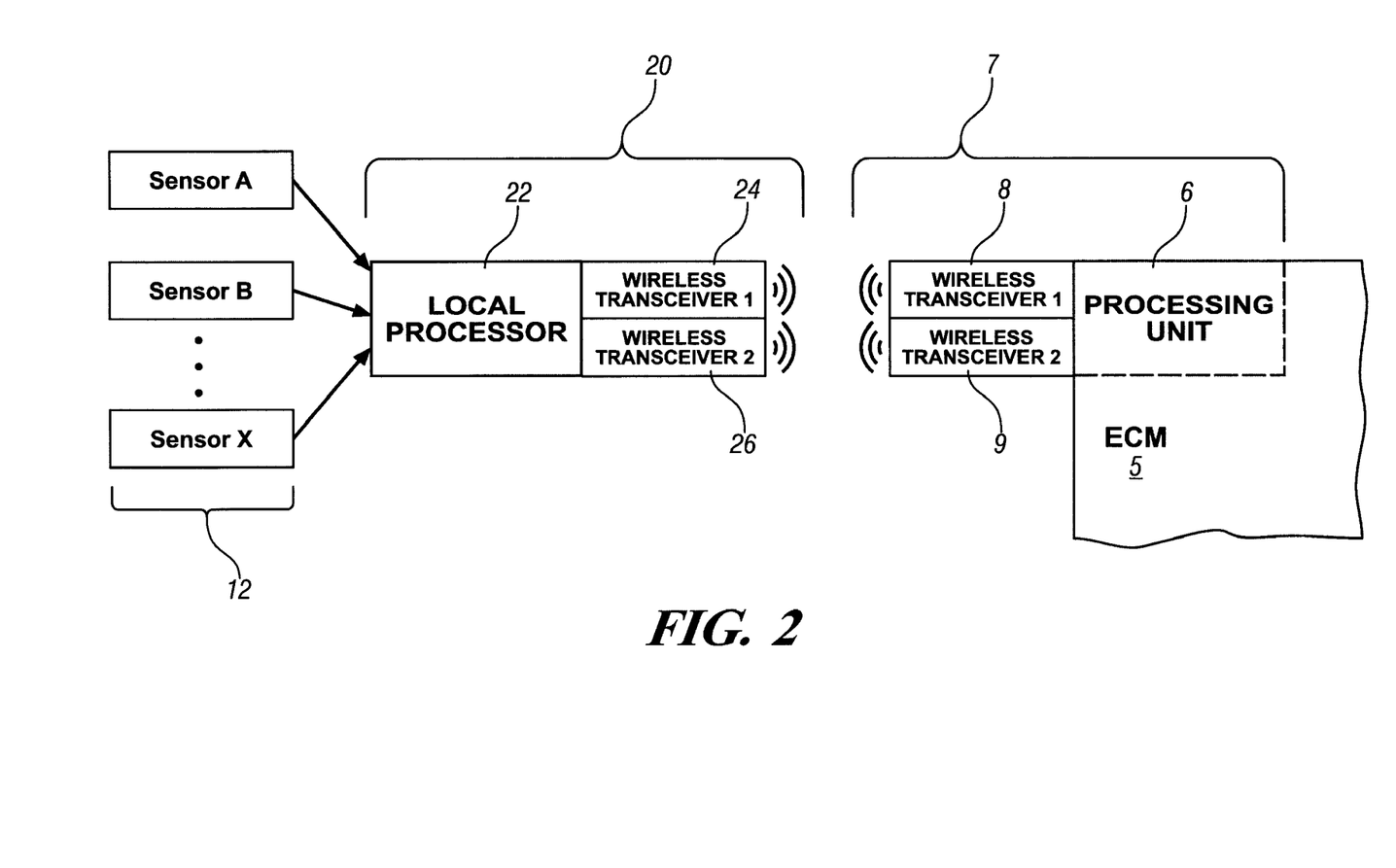
FIG. 2 is a schematic diagram, in accordance with the present invention; and, FIG. 3 is an algorithmic flowchart, in accordance with the present invention.

Referring now to the drawings, wherein the depictions are for the purpose of illustrating the invention only and not for the purpose of limiting the same, FIGS. 1 and 2 depict a schematic of a communications system for a mobile platform which has been constructed in accordance with an embodiment of the present invention. The exemplary system, shown in more detail with reference to FIG. 2, comprises a mobile unit having a plurality of remote sensing devices 12 and actuators 14 signally and operatively connected to a local processor 20. The local processor comprises a processing unit 22 and at least one wireless transceiver 24, 26 operative to communicate with a communications system 7 comprising at least one transceiver 8, 9 connected to a processing unit 6, which is preferably integrated into a central processing unit, e.g., an engine control module (ECM) 5.

By way of illustration, a passenger vehicle is depicted in FIG. 1, with an internal combustion engine 10, and front and rear wheel corner modules 40, 30. It is understood that the principles described herein apply to any on-vehicle systems having local operation, including in-door control systems, in-steering column control systems, entertainment systems, and others. The internal combustion engine 10 typically includes a plurality of sensing devices 12 and actuators 14. All or a subset of the engine sensing devices 12 are signally connected to local processor 20, and all or a subset of the engine actuators 14 are operatively connected to the local processor 20. The local processor 20 is operative to wirelessly communicate with a transceiver 8, 9 of ECM 5. Overall engine operation is controlled by the ECM 5. It is understood that one or more of the engine sensing devices and actuators can be directly signally connected to the ECM. By way of example, the sensing devices 12 signally connected to the local processor 20 can include sensors operative to monitor one or more of the following: ambient temperature, mass airflow, intake manifold pressure, crankshaft position, camshaft position, exhaust gases, throttle position, and, throttle pedal position, among others. By way of example, the engine actuators 14 can include electronic throttle control actuator, exhaust gas recirculation ('EGR'), fuel injectors, variable valve actuation devices, and others.

The front and rear wheel corner modules 40, 30 typically include a plurality of sensing devices and actuators, shown broadly as items 32 for the rear corner and 42 for the front corner. All or a subset of the front and rear corner sensing devices are signally connected to a local processor 34 (rear) 44 (front), and all or a subset of the actuators 14 are operatively connected to one of the local processors 34 (rear) 44 (front). The local processors are operative to wirelessly communicate with a transceiver 27 of a body control module (BCM) 25. Overall operation of braking, suspension, and steering are controlled by BCM 25. The devices of the rear corner module 32 can include three wheel speed sensors, an anti-lock brake actuator, and variable suspension sensors and actuators. The devices of the front corner module 42 can include three wheel speed sensors, an anti-lock brake actuator, and, variable suspension sensors and actuators. In a system equipped with electrical steering, a wheel angle sensor and wheel turning actuator are included.

The ECM 5 and BCM 25 are preferably elements of an overall vehicle control system, comprising a distributed control module architecture operable to provide coordinated system control, preferably signally connected over a local area network device (LAN) 4. The ECM 5 is operable to synthesize pertinent information and inputs from the aforementioned sensing devices, and execute algorithms to control various actuators to achieve control targets, including such parameters as fuel economy, emissions, performance, drivability, and protection of hardware. The BCM 25 is operative to synthesize pertinent information and inputs from the aforementioned sensing devices, and execute algorithms to control various actuators to achieve control targets, including such parameters as anti-lock braking, steering, vehicle heave, pitch, and roll, and, protection of hardware. The ECM 5 and BCM 25 are each preferably general-purpose digital computers generally comprising a microprocessor or central processing unit, storage mediums comprising read only memory (ROM), random access memory (RAM), electrically programmable read only memory (EPROM), high speed clock, analog-to-digital (A/D) and digital-to-analog (D/A) circuitry, and input/output circuitry and devices (I/O) and appropriate signal conditioning, e.g., filtering, and buffer circuitry. A set of control algorithms, comprising resident program instructions and calibrations, is stored in ROM and executed to provide the respective functions of each computer. Algorithms are typically executed during preset loop cycles such that each algorithm is executed at least once each loop cycle. Algorithms stored in the non-volatile memory devices are executed by one of the central processing units and are operable to monitor inputs from the sensing devices and execute control and diagnostic routines to control operation of the respective device, using preset calibrations. Loop cycles are typically executed at regular intervals, for example each 3.125, 6.25, 12.5, 25 and 100 milliseconds during ongoing engine and vehicle operation. Alternatively, algorithms may be executed in response to occurrence of an event.

Each of the local processors 20, 34, 44 is referred to as a collection entity or gateway, comprising an electronic signal processing unit which receives signals from a plurality of sensors, as previously described. As shown in FIG. 2, the local processor 20 comprises processing unit 22 signally and operatively connected to the first wireless transceiver 24 and the second wireless transceiver 26. The ECM 5 includes processing unit 6 signally connected to first wireless transceiver 8 and second wireless transceiver 9. The local processor 22 converts each sensor signal to a form that is transmissible using the wireless transceivers 24, 26 and can include such functions as signal filtering, analog-to-digital conversion, signal scaling and calibration, and others. When the local processor 20 is receiving a control signal from the ECM 5, e.g., to operate an actuator, the processing unit 22 is operative to convert the signal to an actuator control signal, e.g., a pulse-width modulated signal. Each of the local processors 34, 44 is similarly configured.

The local processors are each operable to transmit and communicate signals in an orderly fashion using a plurality of wireless transceivers, as shown. Local processors can be located anywhere in the vehicle. The first wireless transceiver 8 is designated as the primary, or critical transceiver, through which most of the wireless communication occurs. The second wireless transceiver 9 can be optional, designated as a secondary transceiver. The transceivers each preferably employ known short-range digital communications protocols operative at low data transmission rates, in the range of less than 100 kbps (kilobytes per second). One such protocol comprises ZigBee which is based upon IEEE 802.15.4 standard. Other communications protocols can be employed, e.g., WiFi and Bluetooth. The communication of signals over the transceivers preferably takes into account bandwidth of the data transmission channel, and factors related to the signal being communicated including a rate of change in physical parameters that are measured and response times of the sensors, which affects signal size and resolution.

Figure 3A:
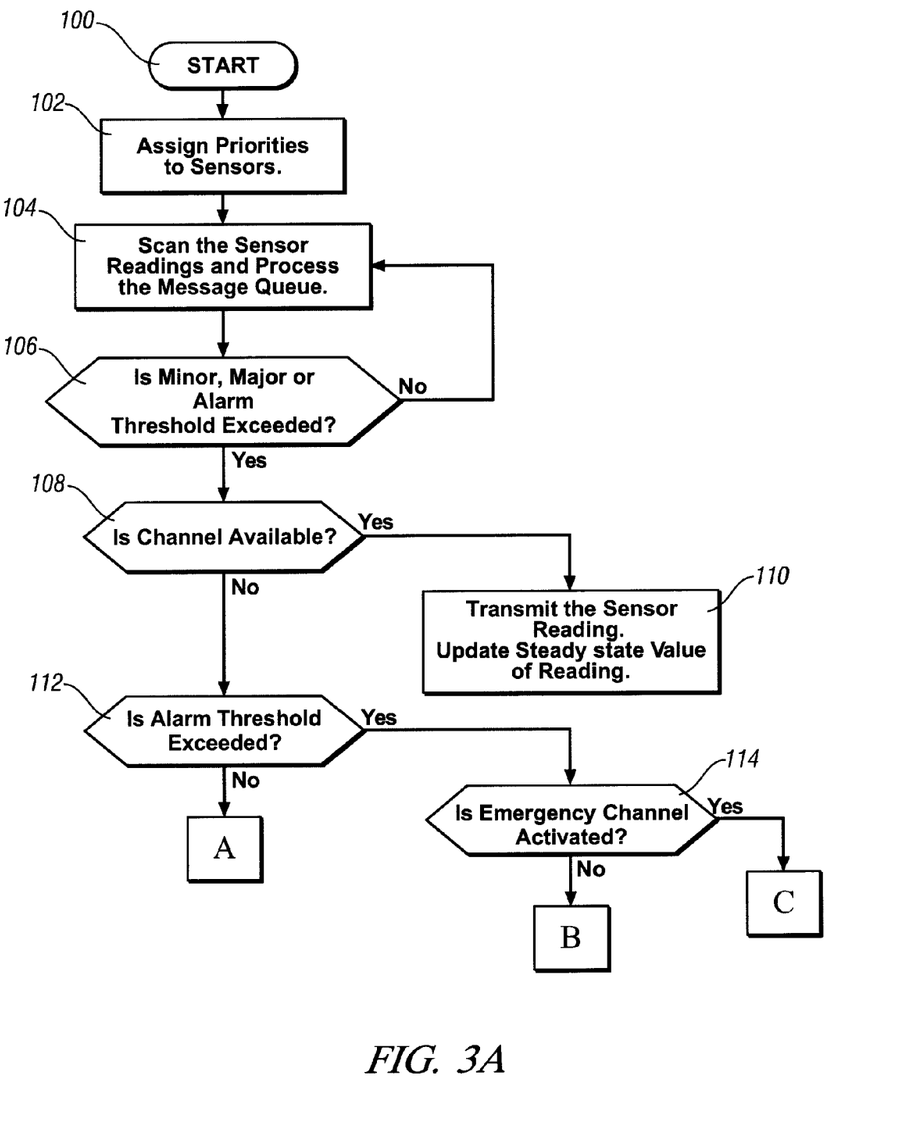
Figure 3B:
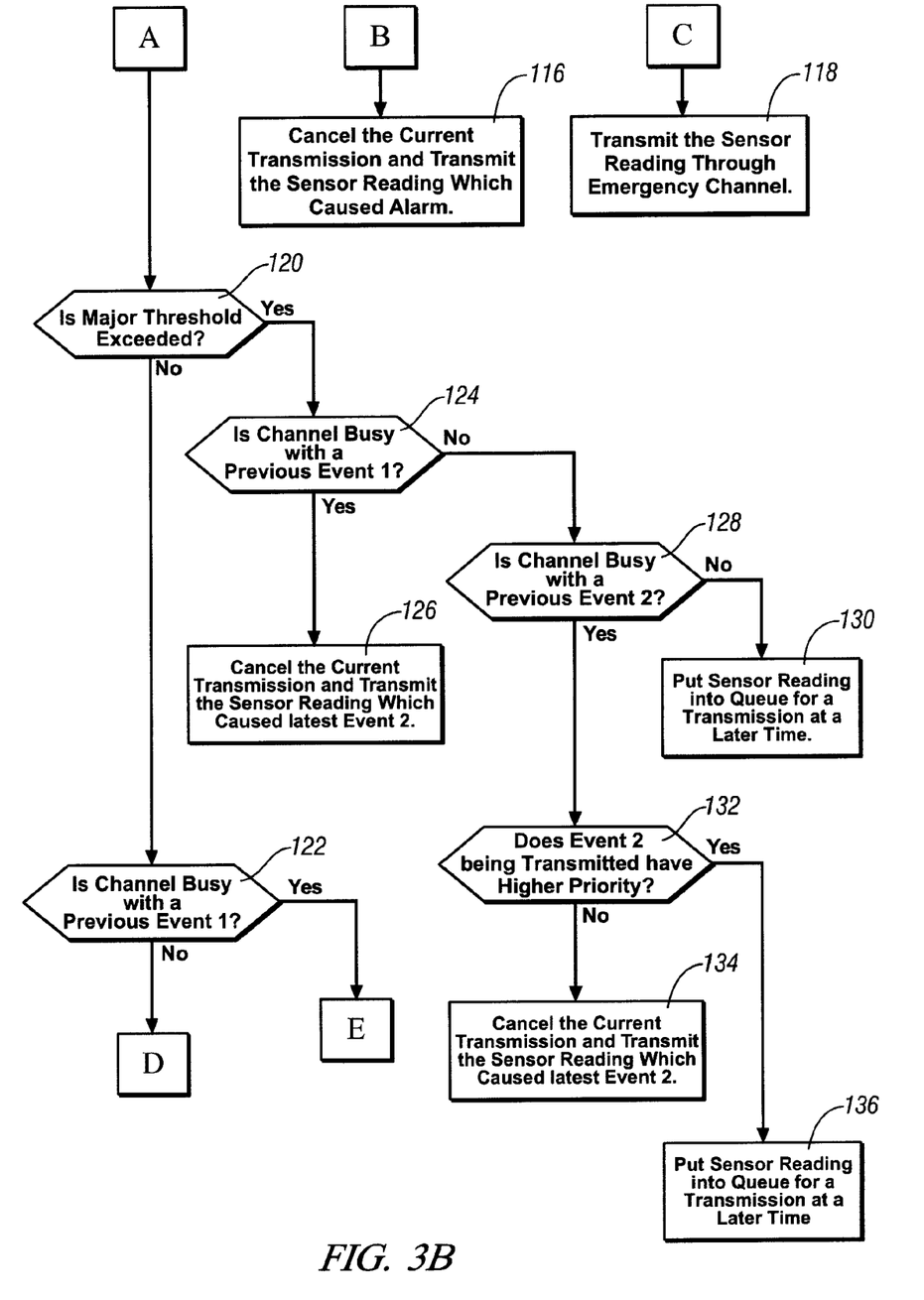
Figure 3C:
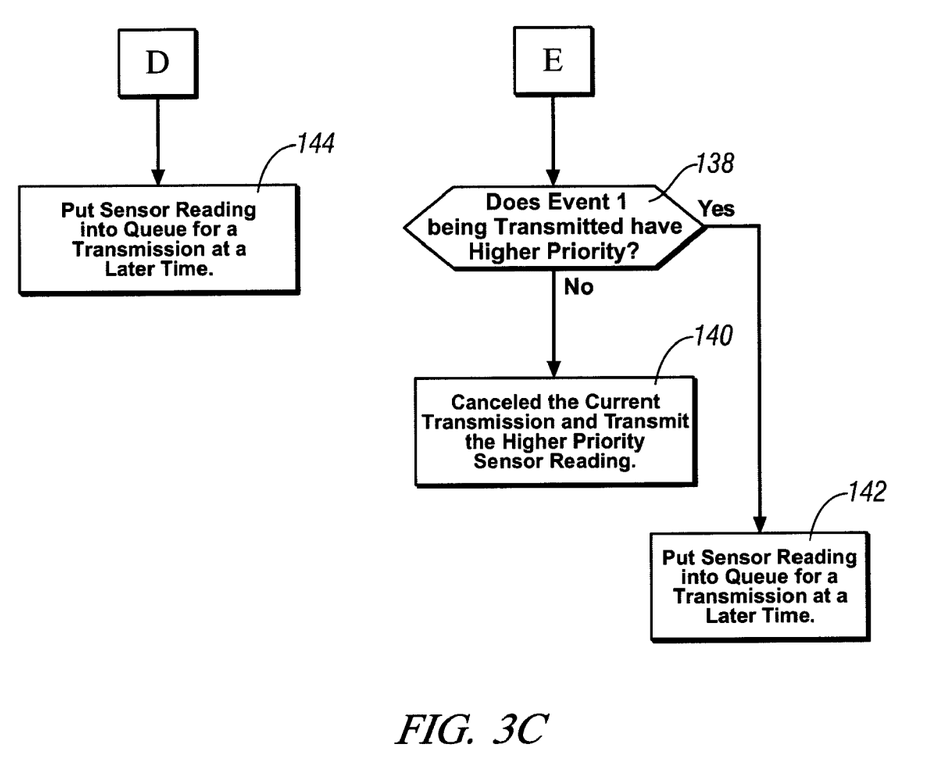

Referring now to FIG. 3, a flowchart depicting an algorithm is described in detail, effective to transmit sensor measurements that are read by one of the local processors 20, 34, 44, which may be located inside a quarter-panel, a passenger compartment, a door, under vehicle hood, or other local locations. In the algorithm, each sensor reading is assigned a priority (102), based upon a perceived importance of the signal, to coordinate order of signal transmission. Signal transmission is preferably an event-based occurrence, rather than a periodic occurrence, to limit air traffic on the transmission channel. Sensor outputs are regularly and ongoingly monitored or scanned and processed in a message queue (104). There is no signal transmission until a threshold is exceeded by one of the monitored sensors (106), generally referred to as non-events. There are three events leading to a request to transmit signals, dependent on three threshold levels, comprising a minor threshold, a major threshold and an alarm threshold. The threshold levels preferably vary for the different sensors being monitored, and are determined according to the nature of the parameter being monitored.

A first-level event leading to triggering a wireless communication occurs when a minor threshold is exceeded by any of the sensors attached to the local processor 20. The first-level event comprises an indication of a change in sensor reading from a previous, steady-state value. When a transmission channel is available (108), the local processor 20 transmits the current sensor reading, i.e., the sensor reading that achieved or exceeded the minor threshold, through the first wireless transceiver 24 and updates the steady-state value of the specific sensor reading (110). When a transmission channel is not available, typically because of a presently occurring signal transmission (108), the local processor 20 next determines whether an alarm threshold has been exceeded (112). When an alarm threshold has been exceeded (112), and the system is equipped with the second transceiver 26 (114), the sensor reading is transmitted via the second transceiver (118). When an alarm threshold has been exceeded (112), and the system is not equipped with the second transceiver 26 (114), the local processor 20 cancels the presently occurring signal transmission, and transmits the sensor reading which exceeded the alarm threshold (116).

When an alarm threshold has not been exceeded (112), it is next determined whether a major threshold has been exceeded (120), also referred to as a second level event. When a major threshold has been exceeded (120) for a sensor reading, it is determined whether the presently occurring wireless signal transmission is a first-level event (124), and, if so, the first-level event transmission is canceled and the second-level event is transmitted (126). When the presently occurring signal transmission is a prior-occurring second-level event (128), it is determined which second level event has higher priority, as assigned hereinabove at 102 (132). When the presently occurring wireless signal transmission does not have higher priority, its transmission is canceled, and the most recent second-level event is transmitted (134). When the presently occurring signal transmission has higher priority, its transmission is continued uninterrupted, and the current second-level event is put into a queue for transmission at a later time (136).

When there is no channel available to transmit the present signal (108), and it is determined that there is no alarm threshold exceeded (112) and no major threshold exceeded (120), it is determined whether a previous first-level event is being transmitted (122). If not, the sensor reading for the first-level event is put into a queue for transmission at a later time (144). When there is previous first-level event is being transmitted (122), it is determined which first-level event has higher priority (138), and either the current transmission is canceled and the most recent reading is transmitted (140), or the most recent first-level event is put into a queue for transmission at a later time (142). In this instance, when the primary transceiver 24 is busy, the processor waits until it is available. There is no priority change among sensor readings since it is a pre-warning situation. The sensor value used by the processing unit, e.g., the ECM or BCM, is updated to the latest sensor reading. Not sending the latest sensor reading is not considered critical since the change in sensor reading is minor. When more than one sensor reading exceeds the minor threshold, triggering the first-level event, the local processor puts all transmission requests into a queue based on current priority levels of each sensor.

There are tradeoffs in determining magnitude of minor threshold values for each of the sensors 12. The minor threshold can be considered as integration step interval. If that threshold is small, then there is a need to transmit additional data, leading to more dense transmission traffic. However, more frequently sending readings reduces the probability of having alarm conditions. Therefore, an optimum minor threshold can be determined for each sensor based on the bandwidth of the transmission channel as previously discussed, the speed of the processor, the rate of change in physical parameters that are measured and the sensor response time.

The local processor 22 can execute algorithms or microcontrollers operative to model expected readings from one or more of the sensors 12, to predict a change in sensor reading sufficient to exceed a minor threshold and trigger a first-level event. Sensor readings may be predicted by observing command signals applied to actuators or by measuring actuator feedback signals. For example, in the engine control application, intake manifold pressure can be predicted based upon an output of the throttle position sensor, which can be another one of the sensors monitored by the local processor 22. Furthermore, a duty cycle for controlling the actuator for the electronic throttle control can be communicated from the ECM to the local processor 22. With these signals as inputs, the local processor can determine whether throttle valve position is being commanded open or closed. When the signal indicates a closing throttle valve, the local controller is able to predict that intake manifold pressure is going to decrease, and, a minor threshold event can be created, causing the local processor to transmit the latest manifold pressure sensor reading when the channel is available. By doing so, idle periods of transmission channel are used more efficiently and while avoiding potential bottlenecks caused by simultaneous multiple sensor readings that exceed critical thresholds.

The second-level event which triggers a communication event comprises a sensor reading which exceeds a major threshold, i.e., one that is larger than a minor threshold, likely necessitating immediate control action by the control module, e.g., the ECM. The second-level event is more important than the first-level event, as there is a need to immediately transmit the sensor reading to the central processing unit for analysis and action by the appropriate control module. In the second-level event, the priorities among sensor readings are reassigned. Three possible scenarios exist, shown with reference again to FIG. 3. In the first scenario, there is no waiting list for signal transmission, and the sensor reading that created the event is transmitted immediately (110). In the second scenario, the processor is currently sending a sensor reading based upon occurrence of a first-level event when the second-level event happens. The second-level event is given a higher priority than the first-level event readings. Therefore, the transmission of the first-level event is cancelled and the sensor reading that generated the second-level event receives the highest priority and is transmitted immediately (126). The third scenario occurs when a second-level event happens while the local processor is transmitting another sensor reading from a previously occurring second-level event. In this case, priority among sensor readings is unchanged. When the sensor reading currently being transmitted has higher priority, the most recent second-level event waits until the processor finishes the transmission of current sensor reading (130). If the currently transmitted sensor reading has lower priority, then it is cancelled and the sensor reading that caused the latest second-level event is transmitted prior to complete transmission of the sensor reading from the first occurring.

The third-level event comprises an alarm event, which preferably seldom happens. When alarm events happen frequently, it indicates that the bandwidth of transmission channel is not sufficiently broad to carry the required information load. An alarm event happens when a sensor reading that had caused a second-level event is not transmitted within a certain amount of time, or the sensor reading exceeds a predetermined alarm threshold which is greater than a major threshold. There are two options in this case. The first option is to give that signal reading the highest priority and delay, re-prioritize, or re-order any other current transmission in order to open a transmission slot. That approach is not a perfect solution since frequent third-level events can build up and bring the system to a state wherein more than one sensor reading is in a third-level event condition, thus creating a communications bottleneck condition. The condition can be alleviated by introducing the second communications path comprising the second transceiver 26 of the local processor 20 and the second transceiver 9 of the central processing unit 6. The second communications path is intended to be used infrequently, and primarily under urgent conditions. Therefore, the channel that is allocated to the second wireless transceiver should not be used or only used infrequently by other systems. In order to make sure that the second channel is lightly loaded, the central processing unit 6 searches the available channels for low traffic load. When a low traffic channel is identified by the central processing unit 6, it informs the other processing units about which channel is selected for the urgent channel. Alternatively, a unique urgent channel can be selected and the same urgent channel is assigned to all vehicles produced by each vehicle manufacturer.

This algorithm can be implemented in an in-vehicle wireless sensor application, where multiple sensor readings are sent over one single transmission channel. Therefore, the available transmission channels are used more efficiently, which is a key factor for the feasibility of wireless sensors in production vehicles. Moreover, because of its preemptive nature, more sensor readings that have different response times or update rates can be accommodated to the hardware architecture shown in FIG. 1. Fitting more sensors into one module means less wires i.e., less cost, more flexibility, and improved reliability. The urgent channel increases the robustness of the system significantly due to a decrease in signal bottlenecks and reduced uncertainty in wireless transmission. Using simple predictive algorithms in wireless modules also decreases the chance of bottlenecks as the sensor reading changes can be predicted before they occur.

The invention has been described with specific reference to the preferred embodiments and modifications thereto. Further modifications and alterations may occur to others upon reading and understanding the specification. It is intended to include all such modifications and alterations insofar as they come within the scope of the invention.

Having thus described the invention, it is claimed:

1. Method for wirelessly transmitting information within a mobile platform from a plurality of sensing devices to a control module, comprising:
   monitoring input signals from the sensing devices;
   assigning a communications priority to each input signal; and
   selectively transmitting the input signals to the control module based upon the communications priority, said selectively transmitting the input signals to the control module corresponding to an occurrence of an event;
   wherein selectively transmitting the input signals to the control module based upon the communications priority comprises
      transmitting a first-level event only when either of a second-level and a third-level event is not being transmitting, and
      transmitting a second-level event when a third-level event is not being transmitted.

2. The method of claim 1, wherein assigning a communications priority to each input signal comprises selectively assigning each input signal as one of a non-event, the first-level event, the second-level event, and the third-level event.

3. The method of claim 2, wherein selectively transmitting the input signals to the control module based upon the communications priority further comprises not transmitting the input signals when all the input signals comprise non-events.

4. The method of claim 3, further comprising selectively assigning the input signal as the non-event when a change in the selected input signal is less than a minor threshold.

5. The method of claim 2, comprising selectively assigning the input signal as the first-level event when a change in the selected input signal exceeds a minor threshold.

6. The method of claim 2, comprising selectively assigning the input signal as the first-level event when a predicted change in the selected input signal exceeds a minor threshold.

7. The method of claim 2, comprising selectively assigning the input signal as the second-level event when a change in the selected input signal exceeds a major threshold.

8. The method of claim 2, comprising selectively assigning the input signal as the third-level event when a change in the selected input signal exceeds a major threshold for greater than a predetermined period of time without being transmitted to the control module.

9. The method of claim 2, comprising selectively assigning the input signal as the third-level event when a change in the selected input signal exceeds a threshold greater than a major threshold.

10. The method of claim 1, further comprising canceling transmitting the first-level event at occurrence of either of a subsequent second-level and third-level event.

11. The method of claim 1, further comprising:
   assigning a sensor-based priority to each input signal from the sensing device; and,
   selectively transmitting one of the second-level event and a subsequent second-level event based upon the sensor-based priority.

12. The method of claim 1, wherein monitoring input signals from the sensing devices further comprises conditioning the input signals.

13. System to wirelessly transmit information within a mobile platform, comprising:
   a control module;
   a wireless communication system; and
   a local processor
      signally connected to a plurality of sensing devices,
      configured to monitor input signals from the sensing devices, and
      configured to use the wireless communication system to selectively transmit information to the control module, the selective transmission comprising
         i) determining a change in each of the input signals
         ii) selectively assigning a communications priority to each input signal based upon the change in the input signals, the communications priority comprising one of a non-event, a first-level event, a second-level event, and a third-level event, and
         iii) selectively transmitting the input signals to the control module based upon the communications priority, said selectively transmitting the input signals to the control module corresponding to an occurrence of an event.

14. The system of claim 13, further comprising the local processor configured to predict a change in one of the input signals and selectively assign the communications priority based upon the predicted change in the input signal.

15. The system of claim 13, wherein the wireless communication system comprises the local processor having first and second transceivers configured to communicate with first and second transceivers of the control module.

16. The system of claim 15, wherein the first transceivers communicate using a communications channel distinctive from a communications channel used by the second transceivers.

17. System to control an actuator in a mobile platform, comprising:
   a local processor signally connected to a plurality of sensing devices and operatively connected to an actuator;
   a control module, configured to determine a control signal for the actuator; and
   a wireless communication system configured to selectively transmit information between the local processor and the control module the system configured to
      i) monitor input signals from the sensing devices,
      ii) assign a communications priority to each input signal based upon a change in the input signal,
      iii) selectively transmit the input signals to the control module based upon the communications priority, and
      iv) communicate the control signal to the local processor.

18. System for wireless communication in a mobile platform, comprising:
   a local processor signally connected to a plurality of sensing devices;
   a control module, configured to determine a control signal for an actuator;
   a wireless communication system configured to selectively transmit information between the local processor and the control module based upon a communications priority, the system configured to
      i) assign a sensor priority to each sensing device, ii) monitor input signals from the sensing devices,
iii) assign a communications priority to each input signal, and
iv) selectively transmit the input signals to the control module based upon the communications priority and the sensor priority.

19. Method for determining a priority for wirelessly transmitted sensor signals from a local processing unit to a central processing unit, comprising:
assigning a priority to each sensor signal;
changing the assigned priority for each sensor signal based upon occurrence of an event affecting the sensor signal;
transmitting each sensor signal based upon the assigned priority; and
wherein the occurrence of an event may comprise the sensor signal exceeding a minor threshold, the sensor signal exceeding a major threshold, and the sensor signal exceeding an alarm level.

* * * * *